United States Patent
Noro et al.

(10) Patent No.: US 12,361,674 B2
(45) Date of Patent: Jul. 15, 2025

(54) OBJECT RECOGNITION USING PARTIAL AND FULL FEATURE VECTOR EXTRACTION RESPECTIVELY APPLYING RECALL RATIO AND PRECISION BASED ON SIMILARITY METRICS OR TRAINING

(71) Applicant: CANON KABUSHIKI KAISHA, Tokyo (JP)

(72) Inventors: Hideo Noro, Tokyo (JP); Kotaro Yano, Tokyo (JP); Hiroshi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 17/813,229

(22) Filed: Jul. 18, 2022

(65) Prior Publication Data
US 2023/0025814 A1 Jan. 26, 2023

(30) Foreign Application Priority Data
Jul. 21, 2021 (JP) ................ 2021-120704

(51) Int. Cl.
*G06V 10/74* (2022.01)
*G06V 10/40* (2022.01)
*G06V 10/774* (2022.01)
*G06V 10/82* (2022.01)
*G06V 40/16* (2022.01)

(52) U.S. Cl.
CPC ............ *G06V 10/761* (2022.01); *G06V 10/40* (2022.01); *G06V 10/774* (2022.01); *G06V 10/82* (2022.01); *G06V 40/161* (2022.01); *G06V 40/168* (2022.01); *G06V 40/172* (2022.01)

(58) Field of Classification Search
CPC .... G06V 10/761; G06V 10/40; G06V 40/168; G06V 40/172; G06V 10/774
See application file for complete search history.

(56) References Cited

U.S. PATENT DOCUMENTS

| | | | |
|---|---|---|---|
| 9,633,284 B2 * | 4/2017 | Nakano | G06V 40/172 |
| 2006/0115157 A1 * | 6/2006 | Mori | G06V 40/174 |
| | | | 382/118 |
| 2006/0204053 A1 * | 9/2006 | Mori | G06F 18/213 |
| | | | 382/118 |
| 2010/0057452 A1 * | 3/2010 | Mukerjee | G10L 15/16 |
| | | | 704/231 |
| 2011/0103694 A1 * | 5/2011 | Nakano | G06V 40/172 |
| | | | 382/190 |

(Continued)

FOREIGN PATENT DOCUMENTS

| | | | | |
|---|---|---|---|---|
| CN | 111242230 A | | 6/2020 | |
| CN | 112712048 A | * | 4/2021 | ............ G06F 16/51 |

(Continued)

OTHER PUBLICATIONS

Liu, Ying-Ho, et al. "Accelerating feature-vector matching using multiple-tree and sub-vector methods." Pattern recognition 40.9 (2007): 2392-2399 (Year: 2007).*

(Continued)

*Primary Examiner* — Michael Robert Cammarata
(74) *Attorney, Agent, or Firm* — Canon U.S.A., Inc. IP Division

(57) ABSTRACT

An apparatus includes an extraction unit configured to extract an N-dimensional feature vector (N is an integer that is greater than M) in a second format including an M-dimensional feature vector (M is an integer of 2 or greater) in a first format from input data, and an identification unit configured to identify a target in the input data based on the feature vector in the first format and the feature vector in the second format.

13 Claims, 10 Drawing Sheets

(56) References Cited

U.S. PATENT DOCUMENTS

| | | | | |
|---|---|---|---|---|
| 2013/0142426 | A1* | 6/2013 | Kaneda | G06V 40/171 |
| | | | | 382/165 |
| 2015/0278580 | A1* | 10/2015 | Sato | G06V 10/7715 |
| | | | | 382/118 |
| 2019/0171665 | A1* | 6/2019 | Navlakha | G06V 10/761 |
| 2019/0332849 | A1* | 10/2019 | Gupta | G06N 3/045 |
| 2020/0175259 | A1* | 6/2020 | Noh | G06V 40/172 |
| 2021/0350176 | A1* | 11/2021 | Klaiman | G06F 18/214 |
| 2022/0027764 | A1* | 1/2022 | Lafond | G06N 3/08 |
| 2022/0165091 | A1* | 5/2022 | Chen | G06V 10/806 |
| 2022/0270348 | A1* | 8/2022 | Xu | G06V 10/751 |
| 2024/0354323 | A1* | 10/2024 | Matei | G06F 16/338 |

FOREIGN PATENT DOCUMENTS

| | | | |
|---|---|---|---|
| CN | 118643734 A | * | 9/2024 |
| JP | 4903192 B2 | | 3/2012 |
| JP | 2020087093 A | | 6/2020 |

OTHER PUBLICATIONS

Liu et al: "Accelerating feature-vector matching using multiple-tree and sub-vector methods", Pattern Recognition, Elsevier, GB, vol. 40, No. 9, May 3, 2007 (May 3, 2007), pp. 2392-2399.

Chopra S et al; "Learning a Similarity Metric Discriminatively, with Application to Face Verification;" Proceedings of the 2005 IEEE Computer Society Conference on Computer Vision and Pattern Recognition (CVPR'05); pp. 1-8.

Deepak Ravichandran et al; "Randomized Algorithms and NLP Using Locality Sensitive Hash Function for High Speed Noun Clustering;" Proceedings of the 43rd Annual Meeting of the ACL, pp. 622-629, Ann Arbor, Jun. 2005; Copyright 2005 Association for Computational Linguistics.

Xiaohua Wang et al., Research on Recognition of Work-piece Based on Improved SIFT Algorithm, 2009, China.

* cited by examiner

OBJECT RECOGNITION USING PARTIAL AND FULL FEATURE VECTOR EXTRACTION RESPECTIVELY APPLYING RECALL RATIO AND PRECISION BASED ON SIMILARITY METRICS OR TRAINING

BACKGROUND

Technical Field

The aspect of the embodiments relates to an identification apparatus, an identification method, and a training method.

Description of the Related Art

Japanese Patent No. 4903192 discusses a face detection apparatus. In a detection area where a face likelihood calculated with use of a first face detection algorithm in a detection area of image data is greater than or equal to a threshold α, the face detection apparatus calculates a face periphery likelihood using a second face detection algorithm. The first face detection algorithm is a high-speed face detection algorithm as compared with the second face detection algorithm, and the second face detection algorithm has a high detection rate and a low false detection rate in the face image area as compared with the first face detection algorithm.

SUMMARY

According to an aspect of the embodiments, an apparatus includes an extraction unit configured to extract an N-dimensional feature vector (N is an integer that is greater than M) in a second format including an M-dimensional feature vector (M is an integer of 2 or greater) in a first format from input data, and an identification unit configured to identify a target in the input data based on the feature vector in the first format and the feature vector in the second format.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the accompanying drawings. The following exemplary embodiments do not limit the disclosure, and all combinations of features described in the exemplary embodiments are not necessarily essential to a means for solving the issues of the disclosure. A configuration of the exemplary embodiments can be corrected or changed as appropriate depending on a specification of an apparatus to which the disclosure is applied and various kinds of conditions (condition of use, usage environment, and the like). The technical scope of the disclosure is defined by the claimed invention, and is not limited by the following individual exemplary embodiments.

In the following description, an object identification apparatus using face authentication is used as an example of an identification apparatus. However, the exemplary embodiments are not limited to the object identification apparatus using face authentication, and can be applied to recognition of a pet such as a dog or a cat, and recognition of an object such as an automobile or a bicycle. The exemplary embodiments may be applied to, other than the object identification apparatus, an image recognition apparatus, a character recognition apparatus, a speech recognition apparatus, and the like, and may be applied to any identification apparatus that performs identification using a feature vector.

Figure 1:
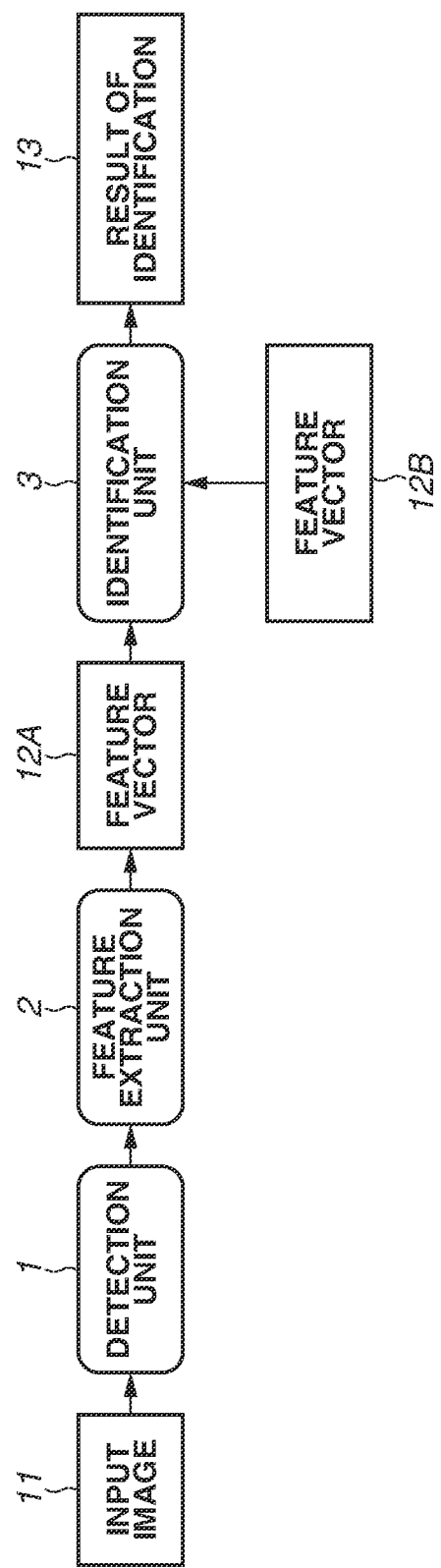
FIG. 1 is a block diagram illustrating a configuration example of an identification apparatus according to a first exemplary embodiment.

FIG. 1 is a block diagram illustrating a configuration example of an identification apparatus according to a first exemplary embodiment. In the example in FIG. 1, a face authentication apparatus is illustrated as the identification apparatus. The face authentication apparatus is capable of identifying who is a human figure seen in a monitoring camera system among preliminarily registered human figures, and can be applied to face authentication in an entrance/exit gate of an entrance/exit management system.

As for a function implemented by software among functional blocks illustrated in FIG. 1, a program for providing a function of each functional block is stored in a memory such as a read-only memory (ROM). The program is implemented by a central processing unit (CPU) loading the program into a random-access memory (RAM) and executing the program. As for a function implemented by hardware, for example, a dedicated circuit is required to be automatically generated from a program for implementing a function of each functional block on a field-programmable gate array (FPGA) circuit using a predetermined compiler. Alternatively, the function of each functional block may be implemented as hardware by formation of a gate array circuit similarly to the FPGA circuit. Still alternatively, the function of each functional block may be implemented by an application-specific integrated circuit (ASIC). The configuration of the functional block illustrated in FIG. 1 is merely an example, and a plurality of functional blocks may constitute one functional block, or any of functional blocks may be divided into a plurality of functional blocks.

In FIG. 1, the face authentication apparatus includes a detection unit 1, a feature extraction unit 2, and an identification unit 3.

The detection unit 1 detects a recognition target, that is, a face area, from the input image 11. The detection unit 1 is capable of detecting the face area using, for example, Multi-task Cascaded Convolutional Neural Networks for Face Detection based on TensorFlow (MTCNN).

The feature extraction unit 2 extracts a feature amount from a face image detected by the detection unit 1. The feature amount can be expressed by a feature vector 12A. In face authentication processing, the feature vector 12A is designed so as to enable determination of whether a human figure is an identical human figure with high accuracy. In a case of face authentication, the feature vector 12A takes a similar value if the human figure is the identical human figure regardless of facial expression, a direction of image-capturing, presence/absence of illumination, and presence/absence of an accessory, and takes a significantly different value if the human figure is a different human figure.

The identification unit 3 collates the feature vector 12A extracted by the feature extraction unit 2 with feature vectors 12B that are preliminarily registered. In identification processing S13, identified is to which of the preliminarily registered feature vectors 12B the feature vector 12A extracted by the feature extraction unit 2 is the closest. At this time, the identification unit 3 can preliminarily register the feature vectors 12B extracted from images of multitudes of known human figures, and collate the feature vector 12A extracted by the feature extraction unit 2 with each of multitudes of preliminarily registered feature vectors 2B.

Each of the feature vectors 12A and 12B mentioned herein is an N-dimensional feature vector in a second format (N is an integer that is greater than M) including an M-dimensional feature vector in a first format (M is an integer of 2 or greater). The identification unit 3 then identifies a face based on feature vectors in the first format and feature vectors in the second format. At this time, the identification unit 3 calculates a first similarity between feature vectors in the first format. In a case where the first similarity is greater than a predetermined value, the identification unit 3 can calculate a second similarity. In this calculation, a recall ratio of the first similarity can be higher than that of the second similarity, and precision of the second similarity can be higher than that of the first similarity. The recall ratio is an identification ratio of the identical object in an input image. In a case of face authentication, the recall ratio is a ratio in which a human figure is determined as the identical human figure in a case where the human figure is the identical human figure. The precision is a ratio of identification, as the identical human figure, that can be made correctly. In a case of face authentication, the precision is a ratio of human figures that are truly identical human figures among human figures that are determined as identical human figures.

Generally, in a case where a similarity between feature vectors of multitudes of human figures is calculated, the feature vectors belong to different human figures in most cases. At this time, a difference in feature vectors between different human figures is larger than a difference in feature vectors between resemblant human figures. In a case of determining whether a human figure is a different human figure, it is possible to secure accuracy in determination even with a small number of dimensions of a feature vector in comparison with a case of determining whether the human figure is the identical human figure. For this reason, the identification unit 3 eliminates, based on the first similarity, feature vectors of different human figures among feature vectors of multitudes of human figures, and identifies feature vectors of resemblant human figures. The identification unit 3 then identifies, based on the second similarity, a feature vector of a truly identical human figure among the feature vectors of the resemblant human figures. This eliminates the need of calculation by the identification unit 3 for obtaining a similarity between high-dimensional feature vectors with respect to feature vectors of multitudes of human figures including different human figures, and enables reduction in calculation amount regarding identification while preventing reduction in accuracy of identification.

Figure 2:
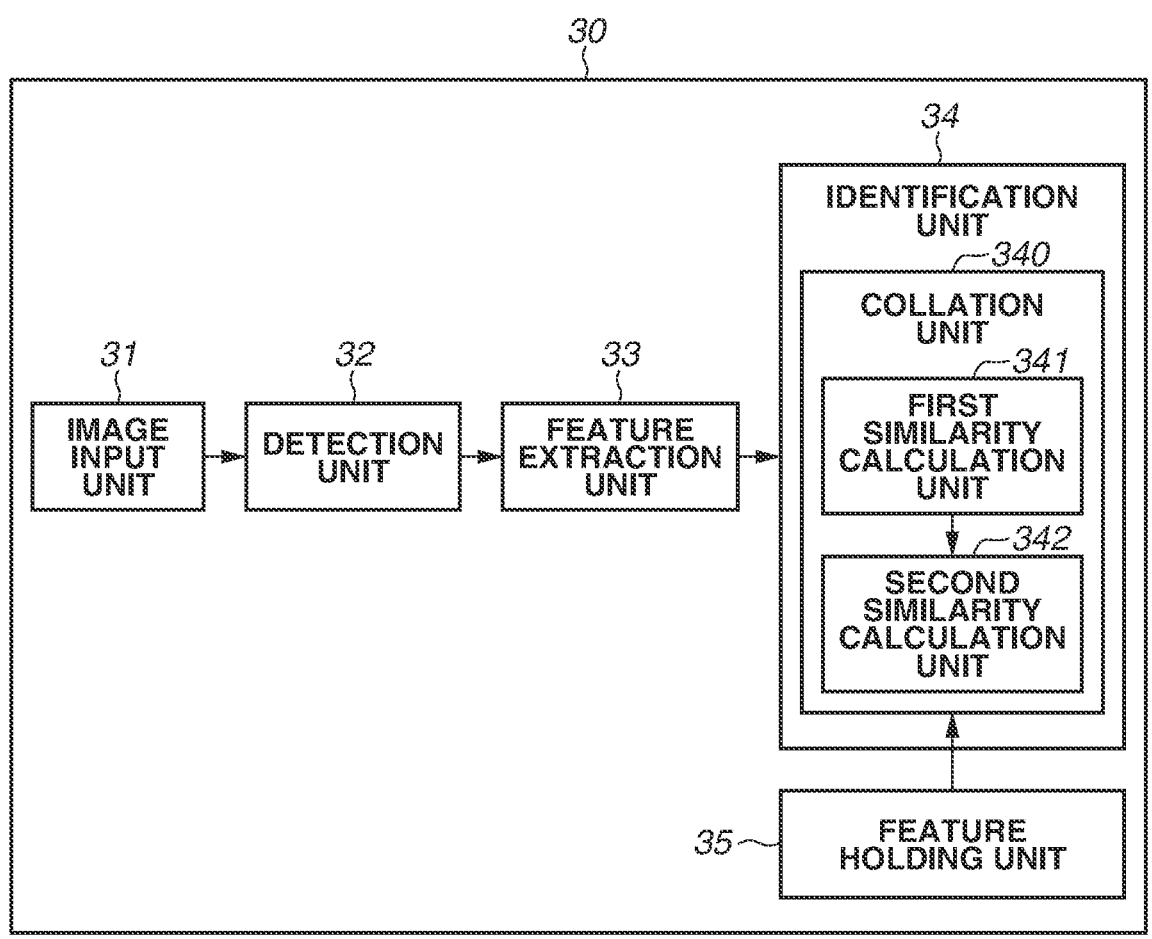
FIG. 2 is a block diagram illustrating a detailed configuration example of the identification apparatus according to the first exemplary embodiment.

FIG. 2 is a block diagram illustrating a detailed configuration example of the identification apparatus according to the first exemplary embodiment.

In FIG. 2, an identification apparatus 30 includes an image input unit 31, a detection unit 32, a feature extraction unit 33, an identification unit 34, and a feature holding unit 35. The identification unit 34 includes a collation unit 340. The collation unit 340 includes a first similarity calculation unit 341 and a second similarity calculation unit 342. The detection unit 32, the feature extraction unit 33, and the identification unit 34 can be respectively used as the detection unit 1, the feature extraction unit 2, and the identification unit 3 illustrated in FIG. 1.

The image input unit 31 inputs an input image 11 illustrated in FIG. 1 to the detection unit 32. The image input unit 31 is, for example, an imaging apparatus such as a camera, or an image recording apparatus.

The detection unit 32 detects an identification target (face image in this case) from the input image 11, and outputs the identification target to the feature extraction unit 33. The feature extraction unit 33 extracts the feature vector 12A from the face image detected by the detection unit 32. The feature holding unit 35 holds the feature vectors 12B extracted from the respective images of multitudes of known human figures.

The identification unit 34 identifies to which of the feature vectors 12B held in the feature holding unit 35 the feature vector 12A extracted by the feature extraction unit 33 is the closest. The collation unit 340 collates the feature vectors 12A and 12B with each other, and calculates a similarity between the feature vectors 12A and 12B. The first similarity calculation unit 341 calculates the first similarity between the feature vector in the first format in the feature vector 12A and the feature vector in the first format in the feature vector 12B. The second similarity calculation unit 342 calculates the second similarity between the feature vector in the second format in the feature vector 12A and the feature vector in the second format in the feature vector 12B. At this time, in a case where the first similarity is greater than a predetermined value, the second similarity calculation unit 342 can calculate the second similarity.

Figure 3:
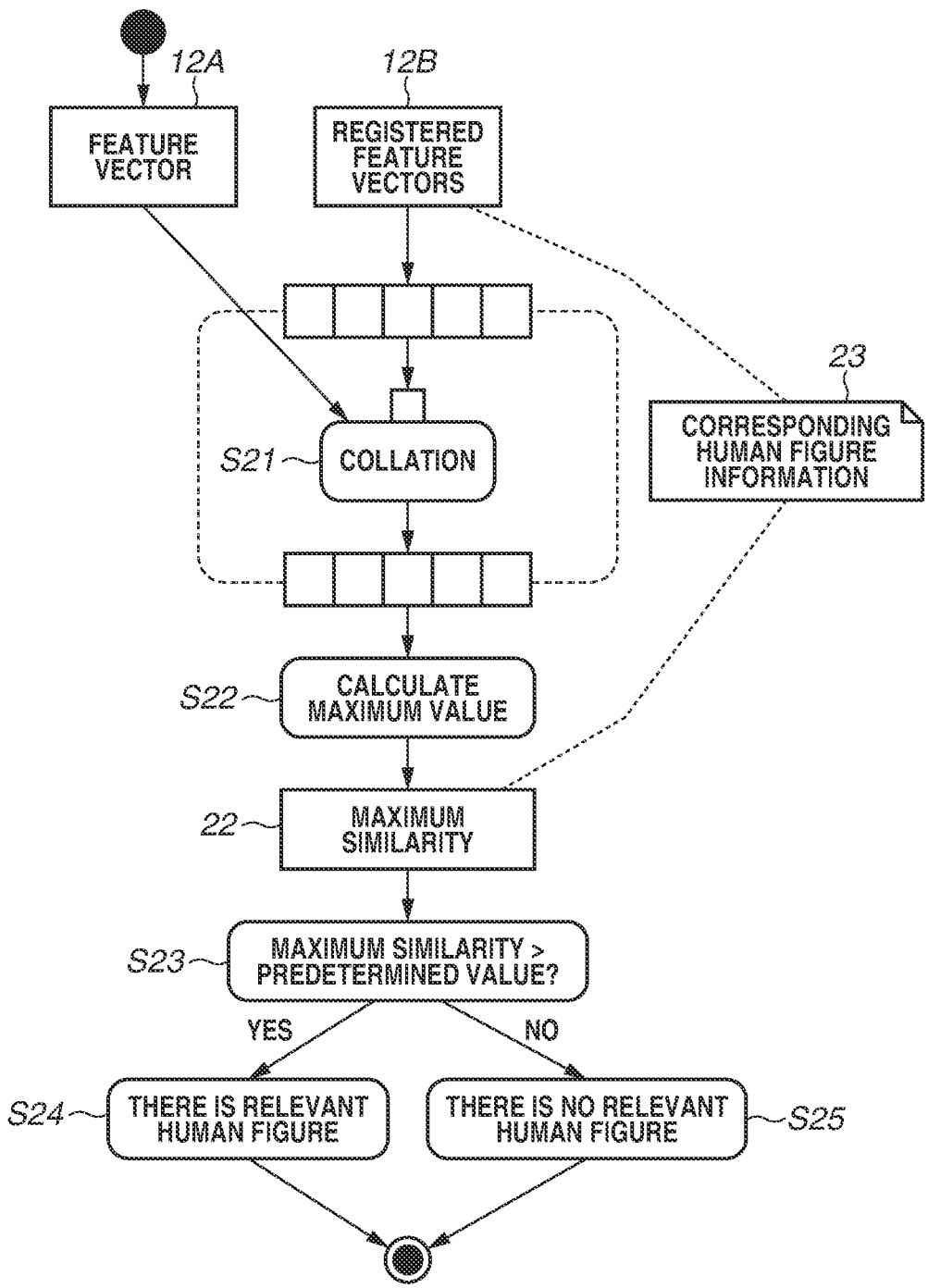
FIG. 3 is a diagram illustrating a schematic flow of processing of an identification unit illustrated in FIG. 2.

FIG. 3 is a diagram illustrating a schematic flow of processing of the identification unit 34 illustrated in FIG. 2. FIG. 3 illustrates an example of collating the feature vector 12A and 12B with each other without distinguishing the feature vectors 12A and 12B between the first format and the second format.

In step S21 in FIG. 3, the identification unit 34 in FIG. 2 calculates a similarity between two feature vectors, that is, the feature vector 12A extracted from the input image 11 and one of the preliminarily registered feature vectors 12B, which serve as input. The registered feature vectors 12B can include corresponding human figure information 23.

If the feature vectors 12A and 12B are close to each other and belong to the identical human figure, the similarity takes a large value. If the feature vectors 12A and 12B belong to different human figures, the similarity takes a small value. There is a case where a distance is used instead of the similarity, but meaning thereof is the same. If the feature vectors 12A and 12B are close to each other, the distance takes a value close to zero. If the feature vectors 12A and 12B are not close to each other, the distance (absolute value) takes a large value. In the present specification, the description is given using the similarity, but the distance may be used.

Subsequently, in step S22, the identification unit 34 calculates similarities of all the registered feature vectors 12B to the feature vector 12A, and thereafter calculates a maximum similarity 22, which is a maximum value of similarities.

Subsequently, in step S23, the identification unit 34 compares the maximum similarity 22 with a predetermined value.

In a case where the maximum similarity 22 is greater than the predetermined value (YES in step S23), the processing proceeds to step S24. In step S24, the identification unit 34 determines that there is a relevant human figure, and identifies the human figure corresponding to the maximum similarity 22 as the human figure seen in the input image 11. In contrast, in a case where the maximum similarity 22 is less than or equal to the predetermined value (NO in step S23), the processing proceeds to step S25. In step S25, the identification unit 34 determines that the feature vector 12A belongs to a human figure that is different from any of registered human figures, and determines that there is no relevant human figure.

In the example in FIG. 3, the identification unit 34 calculates the maximum similarity 22 after calculating similarities of all the registered feature vectors 12B, but may update a maximum value of similarities every time a similarity is calculated. Additionally, to reduce the number of collations in step S21, the identification unit 34 may perform clustering of the registered feature vectors 12B.

The collation processing in step S21 is performed the same number of times as the number of registered feature vectors 12B. For this reason, the number of collations in step S21 is positively correlated to the number of registered feature vectors 12B. As the number of registered feature vectors 12B becomes larger, the number of collations in step S21 becomes larger, and average processing time for collation in step S21 becomes longer. As the number of registered feature vectors 12B becomes larger, a storage capacity of the feature holding unit 35 illustrated in FIG. 2 becomes larger.

To reduce a calculation amount for collation in step S21 and suppress an increase in storage capacity of the feature holding unit 35, each of the feature vectors 12A and 12B is expressed by the N-dimensional feature vector in the second format including the M-dimensional feature vector in the first format. The identification unit 34 then identifies a face based on the feature vector in the first format and the feature vector in the second format.

Figure 4:
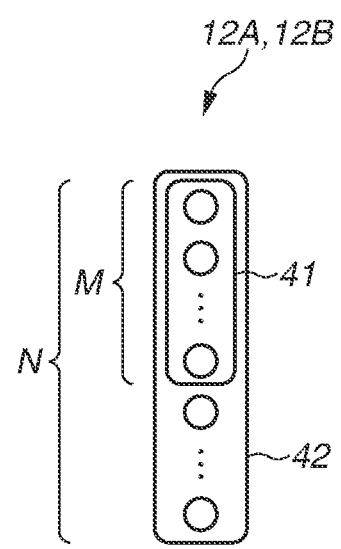
FIG. 4 is a diagram illustrating a configuration example of a feature vector according to the first exemplary embodiment.

FIG. 4 is a diagram illustrating a configuration example of the feature vectors according to the first exemplary embodiment.

In FIG. 4, each of the feature vectors 12A and 12B has a data structure in which an M-dimensional feature vector 41 in the first format is included in an N-dimensional feature vector 42 in the second format.

Each of the feature vectors 12A and 12B has the N-dimensional feature vector 42 in the second format, and can also be handled as the M-dimensional feature vector 41 in the first format when attention is given to the M-dimension, which is part of the feature vector 42. That is, in a case where the two feature vectors 12A and 12B are given to the collation unit 340, the collation unit 340 can calculate the first similarity between the feature vectors 41 in the first format, and also calculate the second similarity between the feature vectors 42 in the second format.

At this time, the feature vector 41 in the first format is set so that a recall ratio with the feature vector 41 in the first format with respect to an identification target (face in this example) is higher than a recall ratio with the feature vector 42 in the second format with respect to the identification target. In addition, the feature vector 42 in the second format is set so that precision with the feature vector 42 in the second format with respect to the identification target is higher than precision with the feature vector 41 in the first format with respect to the identification target.

With this configuration, the identification unit 34 can eliminate, based on the collation between the feature vectors 41 in the first format, the feature vectors 42 in the second format each including the feature vector 41 in the first format belonging to a different human figure while leaving the feature vectors 42 in the second format each including the feature vector 41 in the first format belonging to the identical human figure. Then the identification unit 34 can identify the identical human figure based on collation between the feature vectors 42 in the second format obtained by eliminating the feature vectors 42 in the second format each including the feature vector 41 in the first format belonging to a different human figure. At this time, to identify the identical human figure, the identification unit 34 need not perform collation between the feature vectors 42 in the second format each including the feature vector 41 in the first format belonging to a different human figure, and can thereby reduce a calculation amount for collation.

Figure 5:
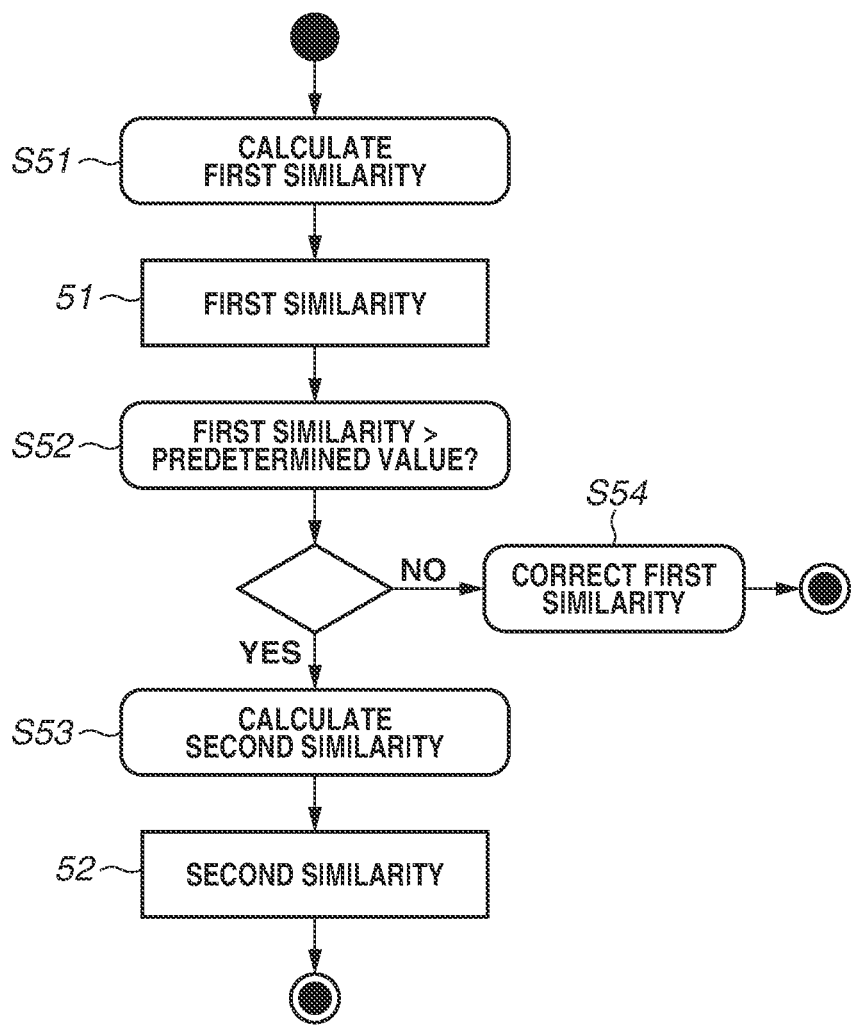
FIG. 5 is a flowchart describing identification processing according to the first exemplary embodiment.

FIG. 5 is a flowchart describing identification processing according to the first exemplary embodiment.

In step S51 in FIG. 5, the first similarity calculation unit 341 illustrated in FIG. 2 collates the feature vector 41 in the first format in the feature vector 12A and the feature vector 41 in the first format in the feature vector 12B with each other, and calculates a first similarity 51.

Subsequently, in step S52, the identification unit 34 determines whether the first similarity 51 is greater than a predetermined value. In a case where the first similarity 51 is greater than the predetermined value (YES in step S52), the processing proceeds to step S53. In step S53, the second similarity calculation unit 342 collates the feature vector 42 in the second format in the feature vector 12A and the feature vector 42 in the second format in the feature vector 12B with each other, and calculates a second similarity 52 that serves as a result of collation in step S21 in FIG. 3. In this processing, the second similarity calculation unit 342 collates the feature vector 42 in the second format including the feature vector 41 in the first format, the first similarity 51 of which is greater than the predetermined value, among the feature vectors 12B held in the feature holding unit 35, with the feature vector 42 in the second format in the feature vector 12A.

At this time, when being able to determine that the human figure is not the identical human figure based on the first similarity 51, the identification unit 34 does not calculate the second similarity 52. Generally, in a case where similarities to feature vectors of multitudes of human figures are calculated, the feature vectors are determined to belong to different human figures in most cases. Hence, the identification unit 34 can omit calculation of the second similarity 52 to most of the feature vectors 12B held in the feature holding unit 35. For this reason, the identification unit 34 can shorten average time required for calculating a similarity between the feature vectors 12A and 12B in comparison with a case of calculating similarities to all the feature vectors 12B held in the feature holding unit 35.

The processing in step S52 is processing for suppressing the number of calculations of the second similarity 52 in step S53. At this time, to calculate a similarity of the identical human figure correctly while suppressing the number of calculations of the second similarity 52, the second similarity 52 needs to be infallibly calculated in a case where the human figure is the identical human figure. Hence, the feature vector 12B with which the second similarity 52 is calculated may include the feature vectors 12B belonging to a small number of non-identical human figures. For this reason, the feature vector 41 in the first format is designed to increase a recall ratio basically to 100%, and the feature vector 42 in the second format is designed to increase precision.

In a case where the first similarity 51 is less than or equal to the predetermined value (NO in step S52), the processing proceeds to step S54. In step S54, the identification unit 34 corrects the first similarity 51, and a result of the correction serves as a result of the collation in step S21.

Similarity correction is correction that enables comparison of a value of the first similarity 51 similarly to the second similarity 52. As this correction, there is a method of correcting the first similarity 51 to be a small constant value that is impossible for the second similarity 52 if the human figure is the identical human figure, and a method of correcting the first similarity 51 to be a value obtained by multiplying the first similarity 51 by a constant so that a small constant value that is impossible for the second similarity 52 if the human figure is the identical human figure is an upper limit value. The similarity correction may be performed using any of these methods. However, if only the maximum similarity 22 is used as a result of the collation in step S21 as illustrated in FIG. 3, in one embodiment, it is only required to use the method of correcting the first similarity 51 to be the small constant value that is impossible for the second similarity 52 if the human figure is the identical human figure.

As described above, according to the first exemplary embodiment, each of the feature vectors 12A and 12B is expressed as the N-dimensional feature vector in the second format including the M-dimensional feature vector in the first format.

The identification unit 34 then identifies, based on the feature vector in the first format and the feature vector in the second format, the identification target, and can thereby reduce a calculation amount for collation between feature vectors, and suppress an increase of a storage capacity necessary for registration of a feature vector.

Figure 6:
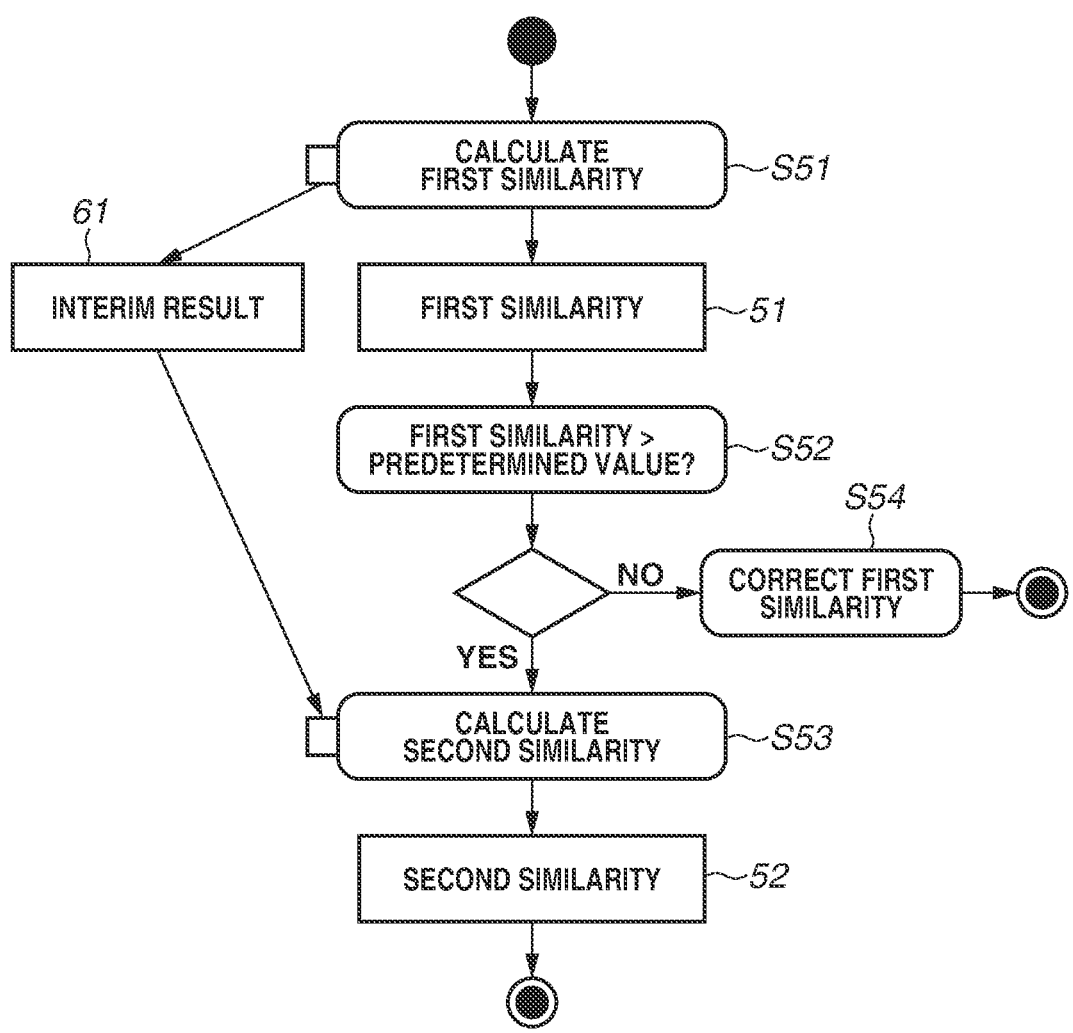
FIG. 6 is a flowchart describing identification processing according to a second exemplary embodiment.

FIG. 6 is a flowchart describing identification processing according to a second exemplary embodiment. In the first exemplary embodiment, in a case where the second similarity 52 is calculated in step S53, the first similarity 51 is calculated in step S51. In a case where a result of calculation of the first similarity 51 is not used for calculation of the second similarity 52 in step S53, processing time is increased by time required for calculating the first similarity 51. Hence, to reduce the processing time, in the second exemplary embodiment, an interim result of calculation of the first similarity 51 is used for calculation of the second similarity 52.

In the processing in FIG. 6, a difference from the processing in FIG. 5 is that an interim result 61 of calculation of the first similarity 51 in step S51 is used for calculation of the second similarity 52 in step S53. At this time, as a similarity between feature vectors, for example, a cosine similarity can be used.

Assuming that two feature vectors for obtaining the similarity are feature vectors $F_x$ and $F_y$, each of the feature vectors $F_x$ and $F_y$ can be expressed by an N-dimensional vector including an M-dimensional vector as indicated by the following Expressions (1) and (2).

$$F_x = (x_1, x_2, \ldots, x_M, x_{M+1}, \ldots, x_N) \quad (1)$$

$$F_y = (y_1, y_2, \ldots, y_M, y_{M+1}, \ldots, y_N) \quad (2)$$

The first similarity 51 is, if expressed by a cosine similarity SA1 between M-dimensional vectors, obtained by the following Expression (3). The second similarity 52 is, if expressed by a cosine similarity SA2 between N-dimensional vectors, obtained by the following Expression (4).

$$SA1 = \frac{\sum_{i=1}^{M} x_i y_i}{\sqrt{\sum_{i=1}^{M} x_i^2} \cdot \sqrt{\sum_{i=1}^{M} y_i^2}} \quad (3)$$

$$SA2 = \frac{\sum_{i=1}^{M} x_i y_i}{\sqrt{\sum_{i=1}^{M} x_i^2} \cdot \sqrt{\sum_{i=1}^{M} y_i^2}} \quad (4)$$

$$= \frac{\sum_{i=1}^{M} x_i y_i + \sum_{i=M+1}^{N} x_i y_i}{\sqrt{\sum_{i=1}^{M} x_i^2 + \sum_{i=M+1}^{N} x_i^2} \cdot \sqrt{\sum_{i=1}^{M} y_i^2 + \sum_{i=M+1}^{N} y_i^2}}$$

$\alpha$, $\beta$, $\gamma$, $\delta$, $\varepsilon$, and $\zeta$ are defined as expressed by the following Expressions (5) and (6).

$$\alpha = \sum_{i=1}^{M} x_i y_i, \beta = \sum_{i=1}^{M} x_i^2, \gamma = \sum_{i=1}^{M} y_i^2 \quad (5)$$

$$\delta = \sum_{i=M+1}^{N} x_i y_i, \varepsilon = \sum_{i=M+1}^{N} x_i^2, \zeta = \sum_{i=M+1}^{N} y_i^2 \quad (6)$$

At this time, the cosine similarity SA1 between the M-dimensional vectors is obtained by the following Expression (7) using $\alpha$, $\beta$, and $\gamma$.

$$SA1 = \frac{\alpha}{\sqrt{\beta \gamma}} \quad (7)$$

The cosine similarity SA2 between the N-dimensional vectors is obtained by the following Expression (8) using $\alpha$, $\beta$, $\gamma$, $\delta$, $\varepsilon$, and $\zeta$.

$$SA2 = \frac{\alpha + \delta}{\sqrt{\beta + \varepsilon} \times \sqrt{\gamma + \zeta}} \quad (8)$$

$\alpha$, $\beta$, and $\gamma$ are also used in calculation of the first similarity 51 in step S51 and calculation of the second similarity 52 in step S53. Hence, the second similarity calculation unit 342 uses the values of $\alpha$, $\beta$, and $\gamma$ calculated by the first similarity calculation unit 341 for calculation of the second similarity 52 as the interim result 61. With this configuration, the collation in step S21 in FIG. 3 merely increases a calculation amount for performing multiplication, division, and calculation of a square root one time each as compared with a case of performing calculation of the first similarity 51 and calculation of the second similarity 52.

In addition, the identification apparatus 30 preliminarily calculates $1/\sqrt{\beta}$, $1/\sqrt{\gamma}$, $1/\sqrt{(\beta+\varepsilon)}$, and $1/\sqrt{(\gamma+\zeta)}$ at the time of feature extraction, and adds a result of the calculation to the feature vector. At this time, the cosine similarity SA1 between the M-dimensional vectors is obtained by the following Expression (9). The cosine similarity SA2 between the N-dimensional vectors is obtained by the following Expression (10). Consequently, a calculation amount for collation in step S21 is merely increased by an amount for calculating multiplication two times.

$$SA1 = \frac{1}{\sqrt{\beta}} \times \frac{1}{\sqrt{\gamma}} \times \alpha \tag{9}$$

$$SA2 = \frac{1}{\sqrt{\beta+\varepsilon}} \times \frac{1}{\sqrt{\gamma+\zeta}} \times (\alpha+\delta) \tag{10}$$

In the first exemplary embodiment, the second similarity 52 is not calculated in most cases of collation in step S21 in FIG. 3. However, in a case where multitudes of similar feature vectors 12B are registered, processing time required for calculating the first similarity 51 itself is increased. In the second exemplary embodiment, even in the case where multitudes of similar feature vectors 12B are registered, it is possible to suppress an increase in time required for calculating the similarity.

While the above description has been given of the example using the cosine similarity as the similarity, another index, for example, a Manhattan distance or a Euclidean distance may be used.

Each of the feature vectors 12A and 12B exhibits a higher recall ratio in the M-dimensional first format, and higher identification performance in the N-dimensional second format. Designing each of the feature vectors 12A and 12B in this manner can reduce a calculation amount for identifying the identical human figure as compared with a case of designing the feature vectors so as to increase the identification performance in the N-dimensional second format. At this time, as the feature extraction unit 33 in FIG. 2, any feature extraction unit that can extract the feature vector 12A exhibiting a higher recall ratio in the M-dimensional first format and higher identification performance in the N-dimensional second format from the face image may be used.

For example, the feature extraction unit 33 may be generated using a deep neural network. There are various kinds of methods as a method of training the deep neural network for identifying an object, a method of Siamese Network [Bromley, 1993] is used as an example in a third exemplary embodiment.

Figure 7:
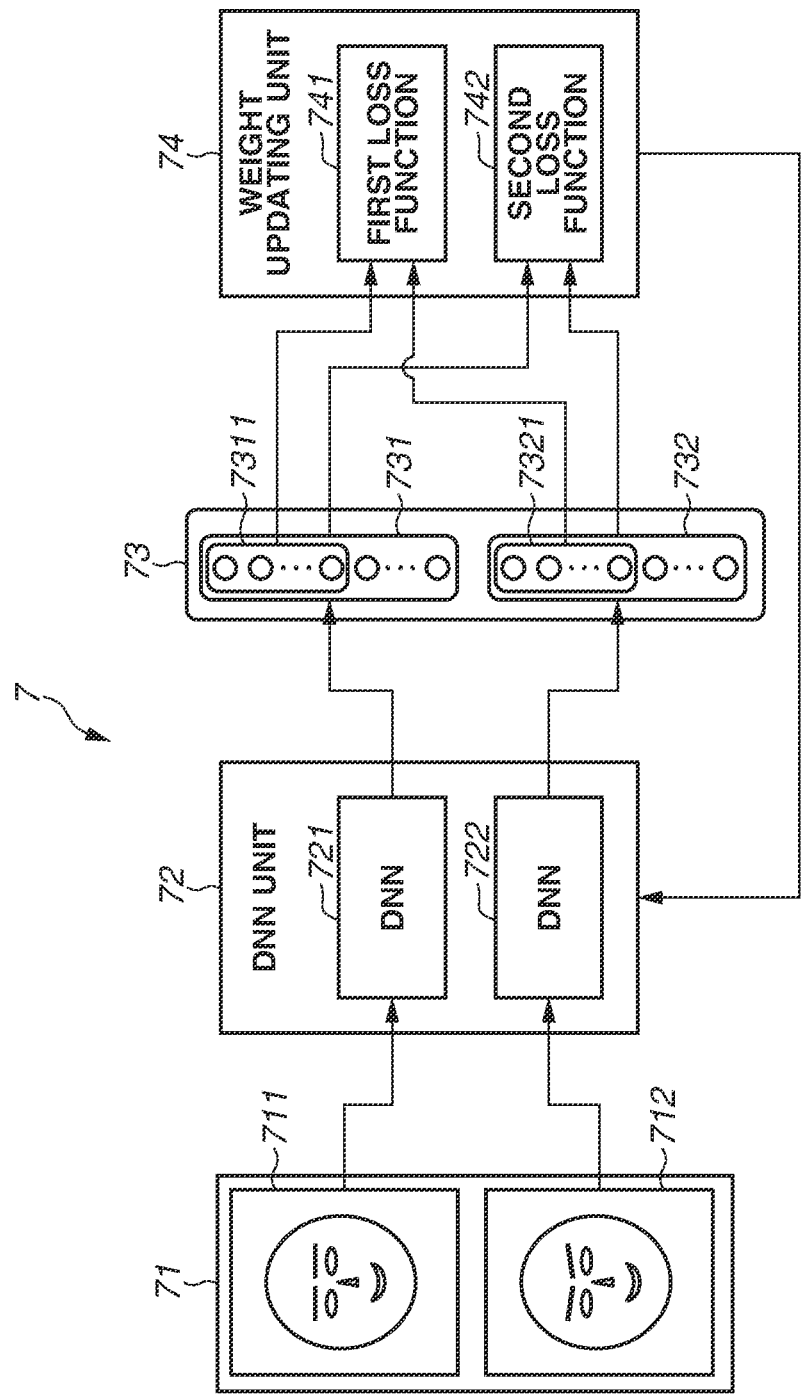
FIG. 7 is a block diagram illustrating a configuration example of a training apparatus according to a third exemplary embodiment.

FIG. 7 is a block diagram illustrating a configuration example of a training apparatus according to the third exemplary embodiment.

In FIG. 7, a training apparatus 7 includes a deep neural network (DNN) unit 72 and a weight updating unit 74. The DNN unit 72 includes DNNs 721 and 722.

The DNNs 721 and 722 each has an identical configuration. The weight updating unit 74 includes a first loss function 741 and a second loss function 742.

An image pair 71, which is a pair of images 711 and 712, is input to the DNN unit 72, a feature vector pair 73, which is a pair of N-dimensional feature vectors 731 and 732, is output from the DNN unit 72. At this time, the image pair 71 corresponds to the feature vector pair 73. A label T, which indicates whether the human figure is the identical human figure and is not illustrated, is additionally provided to the image pair 71. In a case where the human figure is the identical human figure, the label T takes a value of "1". In a case where the human figure is not the identical human figure, the label T takes a value of "0". The image pair 71 to which the label T is additionally provided can be used as training data that trains each of the DNNs 721 and 722.

The training apparatus 7 acquires training data to train each of the DNNs 721 and 722. The image 711 is input to the DNN 721 and the image 712 is input to the DNN 722. The DNNs 721 and 722 extract the N-dimensional feature vectors 731 and 732 from the images 711 and 712, respectively. At this time, the N-dimensional feature vectors 731 and 732 include M-dimensional feature vectors 7311 and 7321, respectively.

At this time, the DNN 721 is trained to extract the M-dimensional feature vector 7311 as the feature vector 41 in the first format, and extract the N-dimensional feature vector 731 as the feature vector 42 in the second format. The DNN 722 is trained to extract the M-dimensional feature vector 7321 as the feature vector 41 in the first format, and extract the N-dimensional feature vector 732 as the feature vector 42 in the second format.

The first loss function 741 is designed to increase identification performance of the feature vector 41 in the first format with the M-dimensional feature vectors 7311 and 7321 serving as input. The second loss function 742 is designed to increase identification performance of the feature vector 42 in the second format with the N-dimensional feature vectors 731 and 732 serving as input. The weight updating unit 74 updates a parameter (weight) of the DNN unit 72 based on the first loss function 741 and the second loss function 742.

For example, the first loss function 741 is a contrastive loss function for the feature vectors 7311 and 7321. A contrastive loss function L can be obtained by the following Expression (11).

$$L = \frac{1}{2}\left(TD^2 + (1-T)\max(\text{margin}-D, 0)^2\right) \tag{11}$$

At this time, a margin is set to be low to increase a recall ratio. The margin is called a hyper parameter, and is adjusted based on an experience, or adjusted while training proceeds.

D represents a distance between the feature vectors 7311 and 7321. For example, it is only required to use the Euclidean distance as D.

As the second loss function 742, the contrastive loss function may be used similarly to the first loss function 741, or another function may be used. In a case where the contrastive loss function is used as the second loss function 742, the margin may be different from a value of the first loss function 741.

The Euclidean distance may be used as D, but another distance index such as the Manhattan distance may be used, or a similarity may be converted to a distance and then used. For example, in a case where a cosine similarity $S_c$ is used, conversion may be performed by using the following Expression (12) or (13)

$$D = 1 - S_c \tag{12}$$

$$D = 1 - \max(S_c, 0) \tag{13}$$

The weight updating unit 74 determines the first loss function 741 and the second loss function 742, and then combines these functions into a loss function $L_{total}$.

Assuming that the first loss function 741 is $L_1$, and the second loss function 742 is $L_2$, the loss function $L_{total}$ can be obtained by the following Expression (14).

$$L_{total} = sL_1 + (1-s)L_2 \qquad (14)$$

At this time, s is a parameter of $0 \le s \le 1$, and is not necessarily a fixed value throughout a period of training. For example, s may be a constant value throughout the entire period of the training, or may be 1 or a value close to 1 at the beginning of the training and thereafter be gradually decreased to a predetermined value.

The weight updating unit 74 uses the loss function $L_{total}$ to update the weight assigned to the DNN unit 72. At this time, since the DNNs 721 and 722 constitute the Siamese Network, weights assigned to the DNNs 721 and 722 are simultaneously updated. The trained DNNs 721 and 722 can be used as the feature extraction unit 33 without being changed.

As described above, according to the above-mentioned third exemplary embodiment, the training apparatus 7 uses the first loss function 741 and the second loss function 742 to train the DNNs 721 and 722. With this configuration, the feature extraction unit 33 that extracts the feature vector 12A exhibiting a high recall ratio in the M-dimensional first format and high identification performance in the N-dimensional second format can be configured using the DNNs 721 and 722.

In a fourth exemplary embodiment, a description is given of an example of using the DNN 721 or 722 trained by the training apparatus 7 illustrated in FIG. 7 as the feature extraction unit 33 illustrated in FIG. 2.

Figure 8:
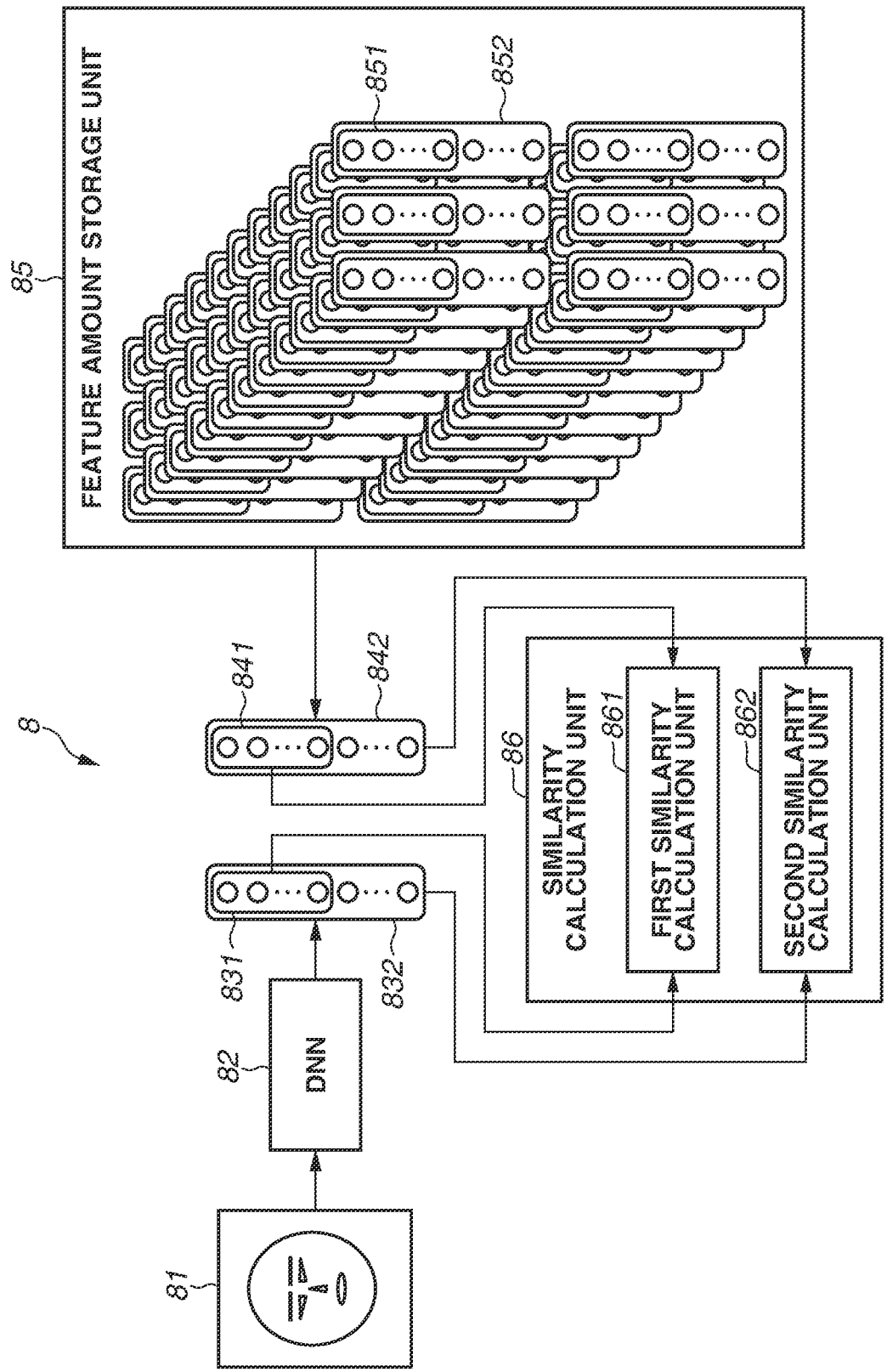
FIG. 8 is a block diagram illustrating a configuration example of an identification apparatus according to a fourth exemplary embodiment.

FIG. 8 is a block diagram illustrating a configuration example of an identification apparatus according to the fourth exemplary embodiment.

In FIG. 8, an identification apparatus 8 includes a DNN 82, a feature amount storage unit 85, and a similarity calculation unit 86. The similarity calculation unit 86 includes a first similarity calculation unit 861 and a second similarity calculation unit 862.

The DNN 82 extracts an N-dimensional feature vector 832 from an image 81. At this time, the N-dimensional feature vector 832 includes an M-dimensional feature vector 831. At this time, the DNN 82 extracts the M-dimensional feature vector 831 as the feature vector 41 in the first format, and extracts the N-dimensional feature vector 832 as the feature vector 42 in the second format.

The feature amount storage unit 85 stores N-dimensional feature vectors 852 extracted from respective images of multitudes of known human figures. At this time, the N-dimensional feature vector 852 includes an M-dimensional feature vector 851. At this time, the M-dimensional feature vector 851 is extracted as the feature vector 41 in the first format, and the N-dimensional feature vector 852 is extracted as the feature vector 42 in the second format.

The first similarity calculation unit 861 collates the M-dimensional feature vector 831 output from the DNN 82 and the M-dimensional feature vector 841 read out from the feature amount storage unit 85 with each other, and calculates a first similarity between the feature vectors 831 and 841. The second similarity calculation unit 862 collates the N-dimensional feature vector 832 output from the DNN 82 and the N-dimensional feature vector 842 read out from the feature amount storage unit 85 with each other, and calculates a second similarity between the feature vectors 832 and 842.

At this time, the second similarity calculation unit 862 collates, among the N-dimensional feature vectors 842 read out from the feature amount storage unit 85, an N-dimensional feature vector 842 including an M-dimensional feature vector 841 whose first similarity is greater than a predetermined value with the N-dimensional feature vector 832. For this reason, the second similarity calculation unit 862 omits collation of the N-dimensional feature vector 842 including the M-dimensional feature vector 841 whose first similarity is less than or equal to the predetermined value with the N-dimensional feature vector 832. At this time, since most of the N-dimensional feature vectors 852 stored in the feature amount storage unit 85 are feature vectors for images of other human figures, the first similarity to the M-dimensional feature vector 841 is less than or equal to the predetermined value in most cases. For this reason, also in a case where multitudes of N-dimensional feature vectors 852 are stored in the feature amount storage unit 85, the second similarity calculation unit 862 can shorten time for collation with the N-dimensional feature vector 832.

Figure 9:
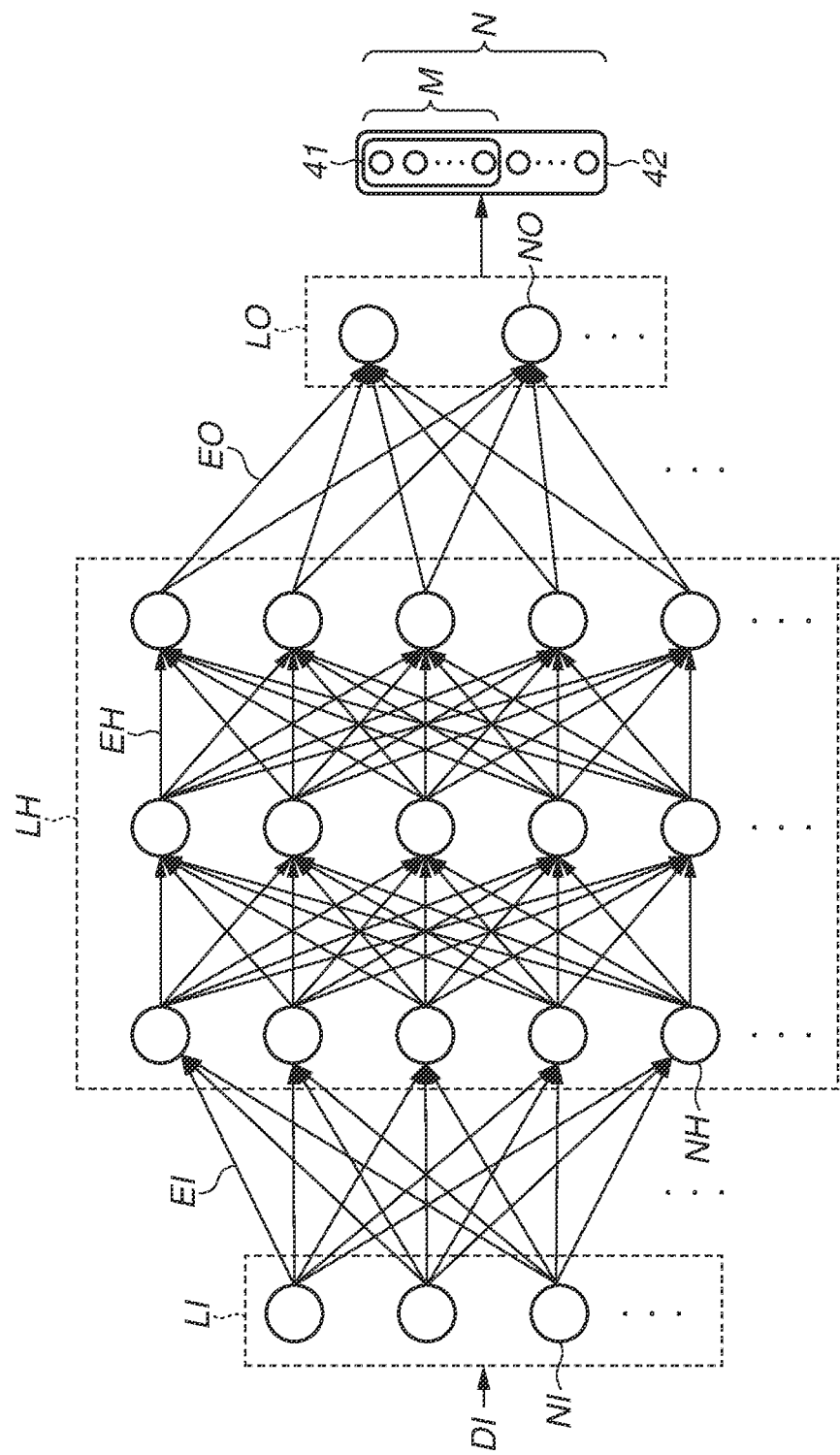
FIG. 9 is a diagram illustrating an example of a model used for feature extraction according to a fifth exemplary embodiment.

FIG. 9 is a diagram illustrating an example of a model used for feature extraction according to a fifth exemplary embodiment. In FIG. 9, a neural network is illustrated as an example of the model used for feature extraction. The model illustrated in FIG. 9 can be used as the DNN 82 illustrated in FIG. 8.

In FIG. 9, the neural network includes an input layer LI, an intermediate layer LH, and an output layer LO. The input layer LI includes a node NI, the intermediate layer LH includes a node NH, and the output layer LO includes a node NO. The node NI is coupled to the node NH via an edge EI, nodes NH are coupled to each other via an edge EH, and the node NH is coupled to the node NO via an edge EO.

Input data DI including an identification target is input to the input layer LI. The output layer LO outputs the N-dimensional feature vector 42 in the second format including the M-dimensional feature vector 41 in the first format with respect to the identification target input to the input layer LI. The intermediate layer LH is trained to output, via the output layer LO, the N-dimensional feature vector 42 in the second format including the M-dimensional feature vector 41 in the first format with respect to the identification target input to the input layer LI, with output from the input layer LI serving as input. At this time, at a training stage of the neural network, a trained model can be generated by training the neural network using the training apparatus 7 illustrated in FIG. 7.

At an inference stage of the neural network, the input data DI including the identification target is input to the input layer LI. The neural network then performs calculation on the output from the input layer LI in the intermediate layer LH, and outputs, from the output layer LO, the N-dimensional feature vector 42 in the second format including the M-dimensional feature vector 41 in the first format with respect to the identification target.

At this time, a weight of each edge EI is assigned to the data input to each node NI of the input layer LI, thereafter the weighted data is input to each node NH of the intermediate layer LH, and the input to each node NH is added to serve as a value of each node NH. The value of each node NH of the intermediate layer LH is non-linearly transformed by an activation function (for example, a Sigmoid function). Weights of the edges EH and EO are assigned to the transformed value, thereafter the weighted value is input to each node NO of the output layer LO, and the input to each node NO is added to serve as a value of each node NO.

Figure 10:
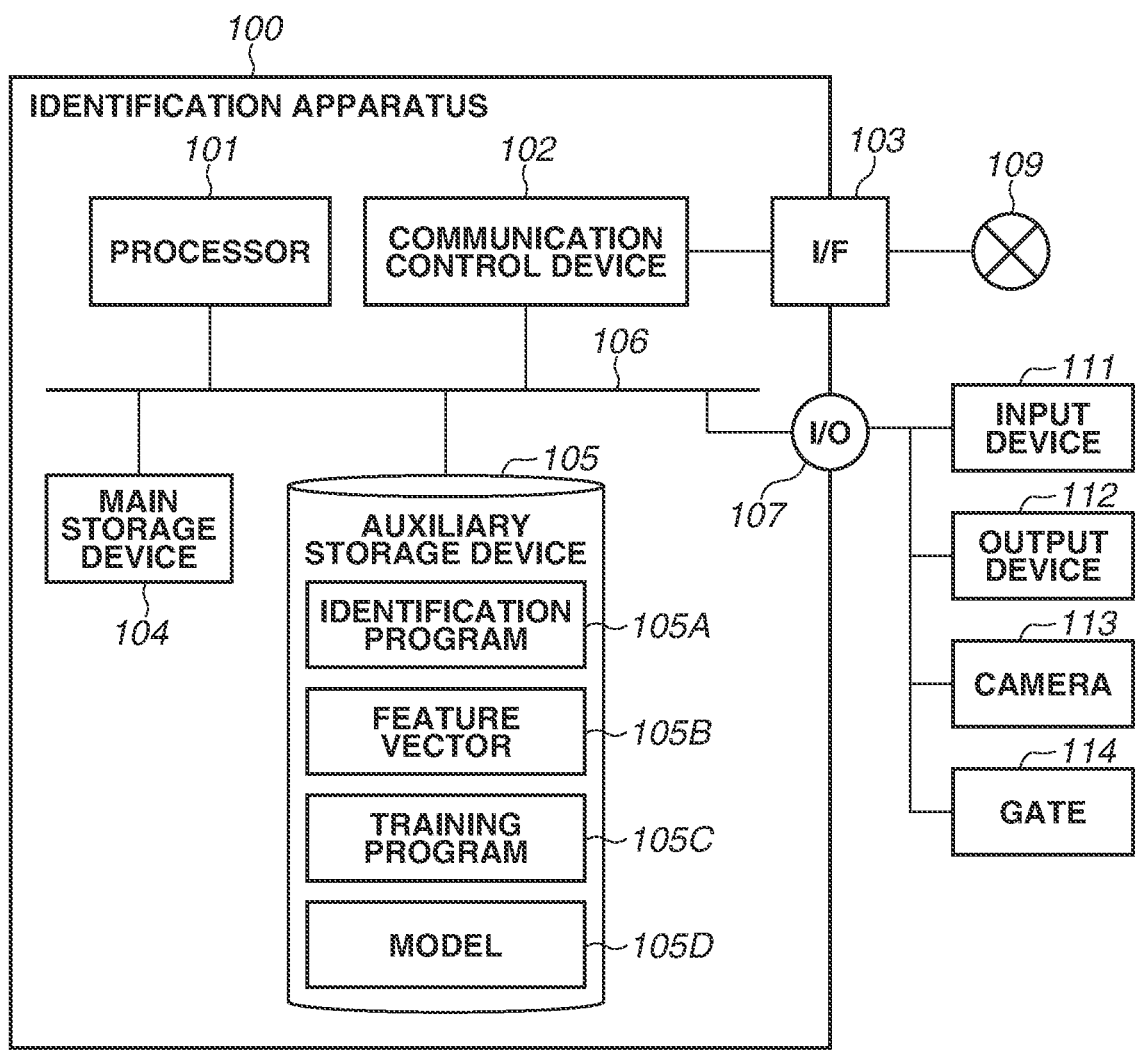
FIG. 10 is a block diagram illustrating a hardware configuration example of an identification apparatus according to a sixth exemplary embodiment.

FIG. 10 is a block diagram illustrating a hardware configuration example of an identification apparatus according to a sixth exemplary embodiment. An identification apparatus 100 can provide functions implemented by software among the functional blocks illustrated in FIGS. 1, 2, and 8.

In FIG. 10, the identification apparatus 100 includes a processor 101, a communication control device 102, a communication interface 103, a main storage device 104, an auxiliary storage device 105, and an input/output interface 107. The processor 101, the communication control device 102, the communication interface 103, the main storage device 104, the auxiliary storage device 105, and the input/output interface 107 are connected to each other via an internal bus 106. The main storage device 104 and the auxiliary storage device 105 can be accessed from the processor 101.

In addition, an input device 111, an output device 112, a camera 113, and a gate 114 are arranged outside the identification apparatus 100. The input device 111, the output device 112, the camera 113, and the gate 114 are connected to the internal bus 106 via the input/output interface 107. Each of the input device 111 and the output device 112 can be used as a human interface.

The input device 111 is, for example, a keyboard, a mouse, or a touch panel, a card reader, and a speech input device. The output device 112 is, for example, a screen display device (a liquid crystal monitor, an organic electro luminescence (EL) display, a graphics card, or the like), a speech output device (speaker or the like), or a print device. The camera 113, for example, captures an image of the face of a human figure and the like. The gate 114 opens/closes based on a result of identification of a human figure by the identification apparatus 100. The gate 114 is, for example, an entrance/exit gate of an entrance/exit management system.

The processor 101 is hardware in charge of controlling operations of the whole of the identification apparatus 100. The processor 101 may be a CPU or a graphics processing unit (GPU). The processor 101 may be a single-core processor, or a multi-core processor. The processor 101 may include a hardware circuit (for example, an FPGA circuit or an ASIC) such as an accelerator that performs part of processing. The processor 101 may operate as a neural network.

The main storage device 104 can be constituted by, for example, a semiconductor memory such as a static random access memory (SRAM) or a dynamic random access memory (DRAM). A program being executed by the processor 101 can be stored in the main storage device 104, and a work area that is used by the processor 101 to execute the program can be arranged in the main storage device 104.

The auxiliary storage device 105 is a storage device provided with a large-storage capacity, and is, for example, a hard disk device or a solid state drive (SSD). The auxiliary storage device 105 can hold data used for execution of execution files of various types of programs and execution of the programs. The auxiliary storage device 105 can store an identification program 105A, a feature vector 105B, a training program 105C, and a model 105D. The identification program 105A, the training program 105C, and the model 105D may be software that can be installed in the identification apparatus 100, or may be incorporated as firmware in the identification apparatus 100. The feature vector 105B is the N-dimensional feature vector 42 in the second format including the M-dimensional feature vector 41 in the first format extracted from images of multitudes of known human figures.

The communication control device 102 is hardware provided with a function of controlling communication with the outside. The communication control device 102 is connected to a network 109 via the communication interface 103. The network 109 may be the Internet, a wide area network (WAN), or a local area network (LAN) of Wireless Fidelity (Wi-Fi) or Ethernet®. The Internet, the WAN, and the LAN may coexist in the network 109.

The input/output interface 107 converts data input from the input device 111 or the camera 113 into data in a data format that can be processed by the processor 101. In addition, the input/output interface 107 converts data output from the processor 101 into data in a data format that can be processed by each of the output device 112 and the gate 114.

The processor 101 loads the identification program 105A and the feature vector 105B that are stored in the auxiliary storage device 105 into the main storage device 104, executes the identification program 105A and the feature vector 105B, and can thereby implement the processing illustrated in FIG. 3, 5, or 6. At this time, the identification program 105A extracts a feature vector from a face image captured by the camera 113. The identification program 105A collates the feature vector extracted from the face image captured by the camera 113 with the feature vector 105B read out from the auxiliary storage device 105, and can thereby implement face authentication. At this time, to extract the feature vector from the face image captured by the camera 113, the identification program 105A can call the model 105D and receive the feature vector extracted from the face image captured by the camera 113 from the model 105D.

To cause the model 105D to extract the feature vector from the face image captured by the camera 113, the processor 101 can load the training program 105C stored in the auxiliary storage device 105 into the main storage device 104 and execute the training program 105C. At this time, the training program 105C trains the model 105D to extract the N-dimensional feature vector 42 in the second format including the M-dimensional feature vector 41 in the first format illustrated in FIG. 4 from the face image captured by the camera 113. At this time, the training program 105C can implement functions of the training apparatus 7 illustrated in FIG. 7.

The execution of the program for implementing the processing in FIG. 3, 5, or 6 may be shared by a plurality of processors or a computer. Alternatively, the processor 101 may instruct a cloud computer or the like via the network 109 to execute all or part of the program for implementing the processing in FIG. 3, 5, or 6, and receive a result of the execution.

Other Exemplary Embodiments

According to the disclosure, a program that implements one or more functions of the above-mentioned exemplary embodiments may be supplied to a system or an apparatus via a network or a storage medium. The one or more functions of the above-mentioned exemplary embodiments can be implemented by one or more processors of a computer of the system or the apparatus reading out and executing the program. Furthermore, the one or more functions of the above-mentioned exemplary embodiments can also be implemented by a circuit (for example, an FPGA circuit or an ASIC) that implements one or more functions. While the exemplary embodiments of the disclosure have been described, the disclosure is not limited to these exemplary embodiments and can be modified and changed in various manners without departing from the scope of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-120704, filed Jul. 21, 2021, which is hereby incorporated by reference herein in its entirety.

What is claimed is:
1. An apparatus comprising:
at least one processor;
a memory coupled to the at least one processor storing instructions that, when executed by the at least one processor, cause the at least one processor to function as:
an extraction unit configured to extract an N-dimensional feature vector (N is an integer that is greater than M) in a second format including an M-dimensional feature vector (M is an integer of 2 or greater) in a first format from input data; and
an identification unit configured to identify a target in the input data based on the feature vector in the first format and the feature vector in the second format,
wherein the identification unit includes:
a first calculation unit configured to calculate a first similarity between feature vectors in the first format; and
a second calculation unit configured to calculate a second similarity between feature vectors in the second format based on a result of the calculation of the first similarity, and
wherein a recall ratio of the first similarity is higher than that of the second similarity, and a precision of the second similarity is higher than that of the first similarity.

2. The apparatus according to claim 1, wherein the input data is image data, and the target is an object.

3. The apparatus according to claim 1, wherein, in a case where the first similarity is greater than a predetermined value, the second calculation unit is configured to calculate the second similarity.

4. The apparatus according to claim 1, wherein the second calculation unit is configured to calculate the second similarity based on an interim result in a case where the first calculation unit calculates the first similarity.

5. The apparatus according to claim 1, wherein the extraction unit is a deep neural network that is trained using a first loss function designed to increase a recall ratio with the feature vector in the first format and a second loss function designed to increase identification performance with the feature vector in the second format.

6. A method, comprising:
extracting an N-dimensional feature vector (N is an integer that is greater than M) in a second format including an M-dimensional feature vector (M is an integer of 2 or greater) in a first format from input data; and
identifying a target in the input data based on the feature vector in the first format and the feature vector in the second format,
wherein the identifying includes:
first calculating a first similarity between feature vectors in the first format; and
second calculating a second similarity between feature vectors in the second format based on a result of the calculation of the first similarity, and
wherein a recall ratio of the first similarity is higher than that of the second.

7. The method according to claim 6, wherein the input data is image data, and the target is an object.

8. The method according to claim 6, wherein, in a case where the first similarity is greater than a predetermined value, the second calculating calculates the second similarity.

9. The method according to claim 6, wherein the second calculating calculates the second similarity based on an interim result in a case where the first calculating calculates the first similarity.

10. A non-transitory storage medium in which a program that causes a computer to execute a method is stored, the method comprising:
extracting an N-dimensional feature vector (N is an integer that is greater than M) in a second format including an M-dimensional feature vector (M is an integer of 2 or greater) in a first format from input data; and
identifying a target in the input data based on the feature vector in the first format and the feature vector in the second formats wherein the identifying includes:
first calculating a first similarity between feature vectors in the first format; and
second calculating a second similarity between feature vectors in the second format based on a result of the calculation of the first similarity, and wherein a recall ratio of the first similarity is higher than that of the second.

11. The non-transitory storage medium according to claim 10, wherein the input data is image data, and the target is an object.

12. The non-transitory storage medium according to claim 10, wherein, in a case where the first similarity is greater than a predetermined value, the second calculating calculates the second similarity.

13. The non-transitory storage medium according to claim 10, wherein the second calculating calculates the second similarity based on an interim result in a case where the first calculating calculates the first similarity.

* * * * *